United States Patent [19]

Kang et al.

[11] 3,863,257
[45] Jan. 28, 1975

[54] PASSIVE RANGING BY TIME DIFFERENCE MULTI-PATH

[75] Inventors: George S. Kang, Silver Spring, Md.; Allan E. Berry, Thousand Oaks, Calif.

[73] Assignee: The United States of America as represented by the Secretary of the United States Air Force, Washington, D.C.

[22] Filed: June 27, 1972

[21] Appl. No.: 268,225

[52] U.S. Cl...... 343/112 D, 235/150.27, 343/112 R
[51] Int. Cl. .......................... G01s 5/02, G01s 5/12
[58] Field of Search............ 235/150.27; 343/112 R, 343/112 C, 112 D

[56] References Cited
UNITED STATES PATENTS

| | | | |
|---|---|---|---|
| 2,971,190 | 2/1961 | Busignies | 343/112 R |
| 3,112,484 | 11/1963 | McKeown | 343/112 R |

Primary Examiner—Maynard R. Wilbur
Assistant Examiner—Richard E. Berger
Attorney, Agent, or Firm—Harry A. Herbert, Jr.; Julian L. Sirgel

[57] ABSTRACT

Range from an observer to an electromagnetic emitter is determined by the geometry of ellipse in which the observer is at one focus, the emitter is at the other focus, and a reflector lies on the locus. The time difference of arrival of the direct signal from the emitter and the reflected signal is measured and used to compute the distance from the vortex behind the observer to the observer. Also the rate of change of the successive time differences of arrival is determined and this value together with the observer's speed and the emitter bearing is used to compute the reflector's position with respect to the observer. The reflector's position and the vortex to observer's position is used to compute the eccentricity of the ellipse which is in turn used together with time difference of arrival to compute the range.

2 Claims, 5 Drawing Figures

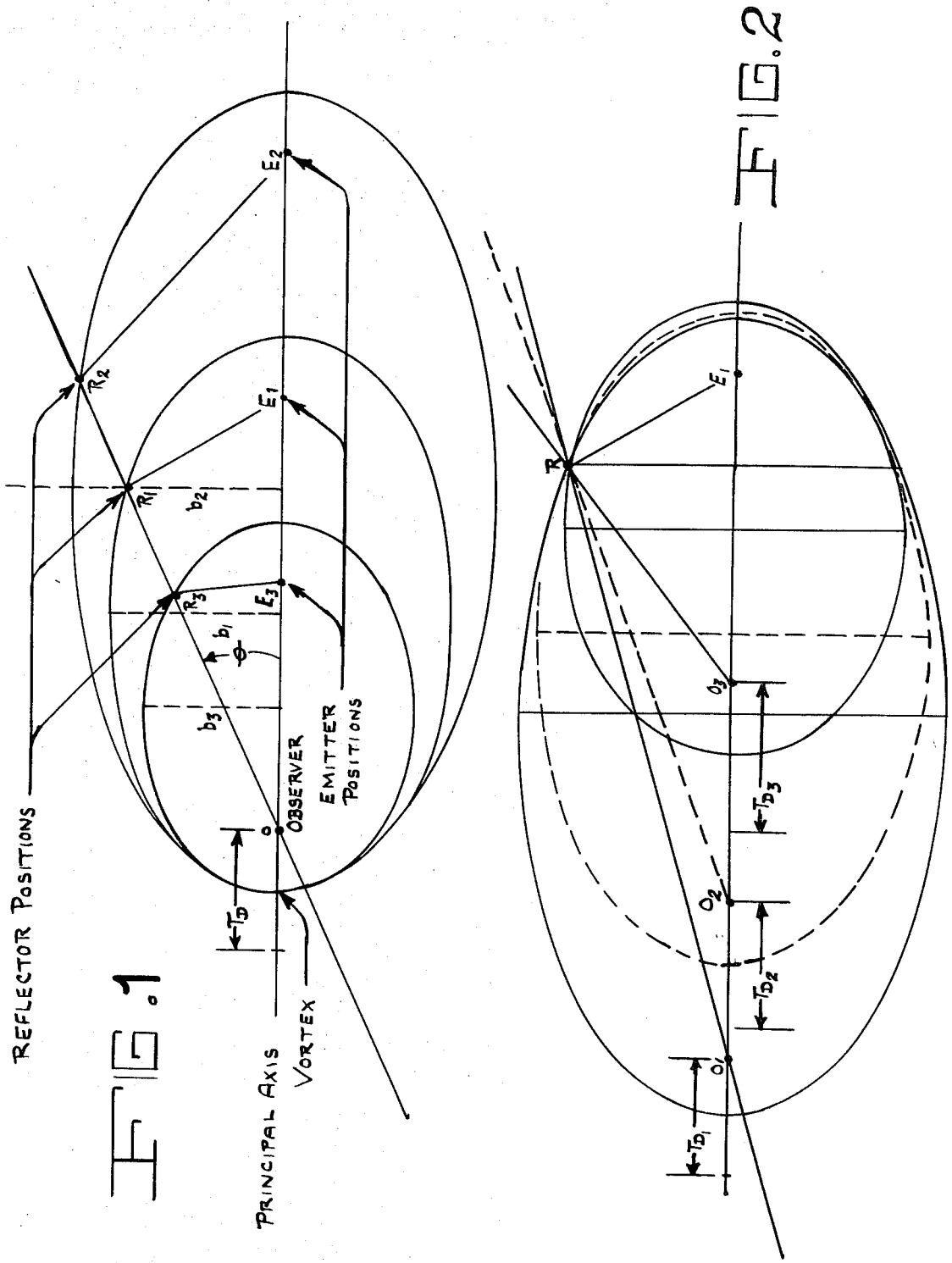

PASSIVE RANGING BY TIME DIFFERENCE MULTI-PATH

BACKGROUND OF THE INVENTION

This invention relates to passive ranging of an electromagnetic emitter, and more particularly to a ranging technique based on the time difference multi-path of the emitter.

Many occasions arise when a requirement is stipulated for passive ranging by a single observer of an electromagnetic radiator. Numerous techniques have evolved for accomplishing this task. Most of these techniques have one requirement in common; they will not function unless the observer takes two or more separate measurements at two or more separate geographical locations as typified by geographical survey measurement. A common restriction is imposed on these measurement techniques in that the two or more geographical locations from which measurements are made, cannot be colinear with the emitter location (two measurement points cannot lie on the same line with the emitter location.) This inventioon overcomes this restriction and allows an observer to travel in any direction relative to the emitter location, including directly toward the eiitter, and to accurately obtain the range between his position and that of the emitter.

Only two other approaches are known to overcome the restriction of noncolinearity. The first technique depends upon not only measuring an azimuth angle but also an elevation angle. In practice, this approach is very difficult to implement for high accuracy range measurement unless large elevation angles are available and this severely limits its use. The second technique depends upon measuring received power and again is severely limited in potential accuracy.

SUMMARY OF THE INVENTION

The invention uses emitter reflections as an additional source of information to obtain emitter range/location and boresight ranging capability without measuring elevation angle. Boresight ranging allows use of inherently more accurate boresight angular accuracy, hence, increasing range measurement accuracy. Only one angular measurement is required for boresight range measurement as the boresight heading angle and bearing angle are synonymous; therefore angular error contribution is attributable to a single source. Passive range measurement can also be made on an electromagnetic radiator regardless of the observer azimuthal angle to the radiator.

It is therefore an object of the invention to provide a method and system of ranging in which the observer is completely passive and no use is made of any type of on-board radiator.

It is another object of the invention to provide a method and system of passive ranging in which a moving observer can obtain accurate emitter range and/or location while moving in any azimuth direction including directly toward or away from the emitter.

It is still another object to provide another method and system of passive ranging in which only one observer is required to make a complete range/location measurement.

It is yet another object to provide a passive ranging system in which the antenna configuration can be stationary and amenable to aircraft ranging and in the case of boresight ranging, the restrictions on antenna pattern perturbations would be less rigorous than in other ranging approaches.

It is still another object to provide a passive ranging system in which, if a true boresight course is held, no angular measurement is required.

It is yet another object to provide a ranging system capable of preserving high range accuracy with relatively short smoothing times and amenable to several methods of real-time data smoothing which may be used individually or in any combination to enhance range accuracy.

These and other objects, advantages and features of the invention will become more apparent from the following description taken in connection with the illustrative embodiments in the accompanying drawings.

DESCRIPTION OF THE DRAWINGS

FIG. 1 shows the static geometry of a family of ellipses upon which the invention is based;

FIG. 2 shows the dynamic geometry of a family of ellipses associated with an observer moving in the boresight direction;

DETAILED DESCRIPTION OF THE PREFERRED EMBODIMENT

The invention is first explained by describing a static geometry situation which is defined as monopulse measurement such that the observer can be considered stationary no matter what his relative speed. This geometry is presented referring to FIG. 1 which uses one emitter and an observer detecting the emitter on a boresight measurement and one reflector. With these conditions the following is known or can be measured: the angle at which the emitter lies; the angle at which the reflector lies measured on a monopulse basis; the location of the observer with respect to geographical coordinates; and the time difference of arrival of the reflected and direct signal.

It is therefore known, within some predictable measurement accuracy, that the emitter lies along the horizontal axis of FIG. 1 and the reflector along some axis at an angle $\theta$ with the horizontal axis. This then presents complete angular information without range. The measurement of the time difference of arrival of the reflected and direct signals $T_D$ defines a family of ellipses with a common axis and one common focal point O. The emitter lies at the second focal point $E_1$, $E_2$, or $E_3$ of one of the ellipses, however, from the information given, it is impossible to determine which one of the ellipses in the family. The reflector lies on one of the ellipses; however, again, insufficient information is available to determine which of the ellipses. Expressed another way, given two foci one of which we call an observer and the second an emitter and a measured value of time differences $T_D$, there are an infinite number of points which will provide a given $T_D$ and which will trace an elliptical function. Moreover, the elliptical function and angular information appear to be completely independnet and no mathematical expression has been found to relate the two such as to resolve the inifinite ambiguity which exists in emitter location.

Figure 3:
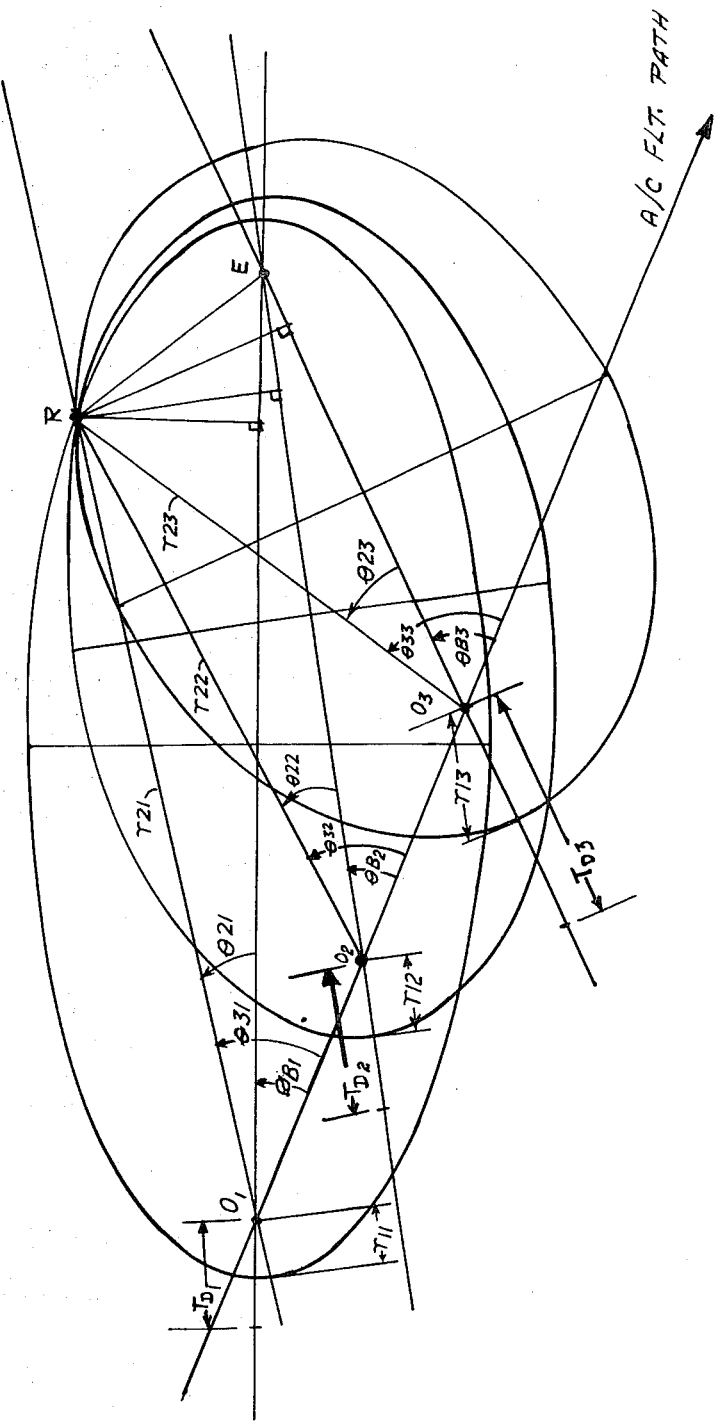
FIG. 3 shows the dynamic geometry of a family of ellpses associated with an observer moving in a non-boresight direction.

As explained, without additional information the static situation provides an unsolvable situation. One means of generating this additional information is to allow the observer to move. To meet the stipulation of minimum multi-path signal change the mesurement time must be kept to a minimum. The geometry under dynamic conditions is shown in FIG. 2 for the boresight case, and FIG. 3 shows the conditions in the non-boresight condition. As with the static condition, a family of ellipses is generated for each observer position. With the change of observer position two additional pieces of information are generated, i.e., time rate of change of the time difference measurement and rate of change of the reflection angle. For the ellipse, from each family of ellipses associated with the actual emitter position, one additional characteristic is of importance: the point determined by the reflector and the chord parallel to the minor axis and passing through this point are common to all ellipses and remain invariant.

Based on the dynamic geometry outlined above, the following computational approach may be made to determine the range to an emitter. It is assumed that only one emitter is seen and only one reflected signal is used at any one time. The observer is moving on a homing or boresight course.

Figure 4:
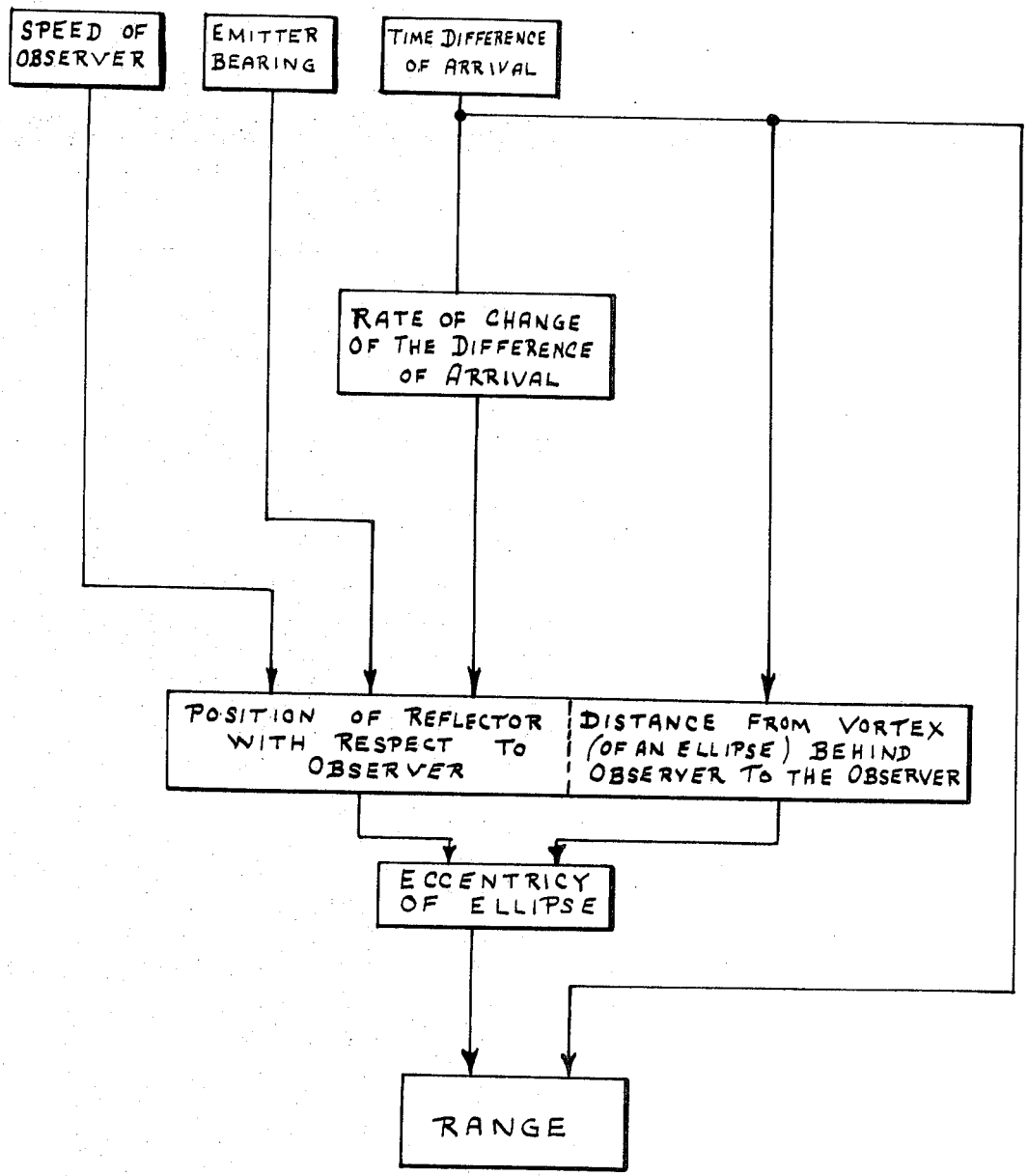
FIG. 4 is a basic flow diagram showing the computational procedures and programming.
Figure 5:
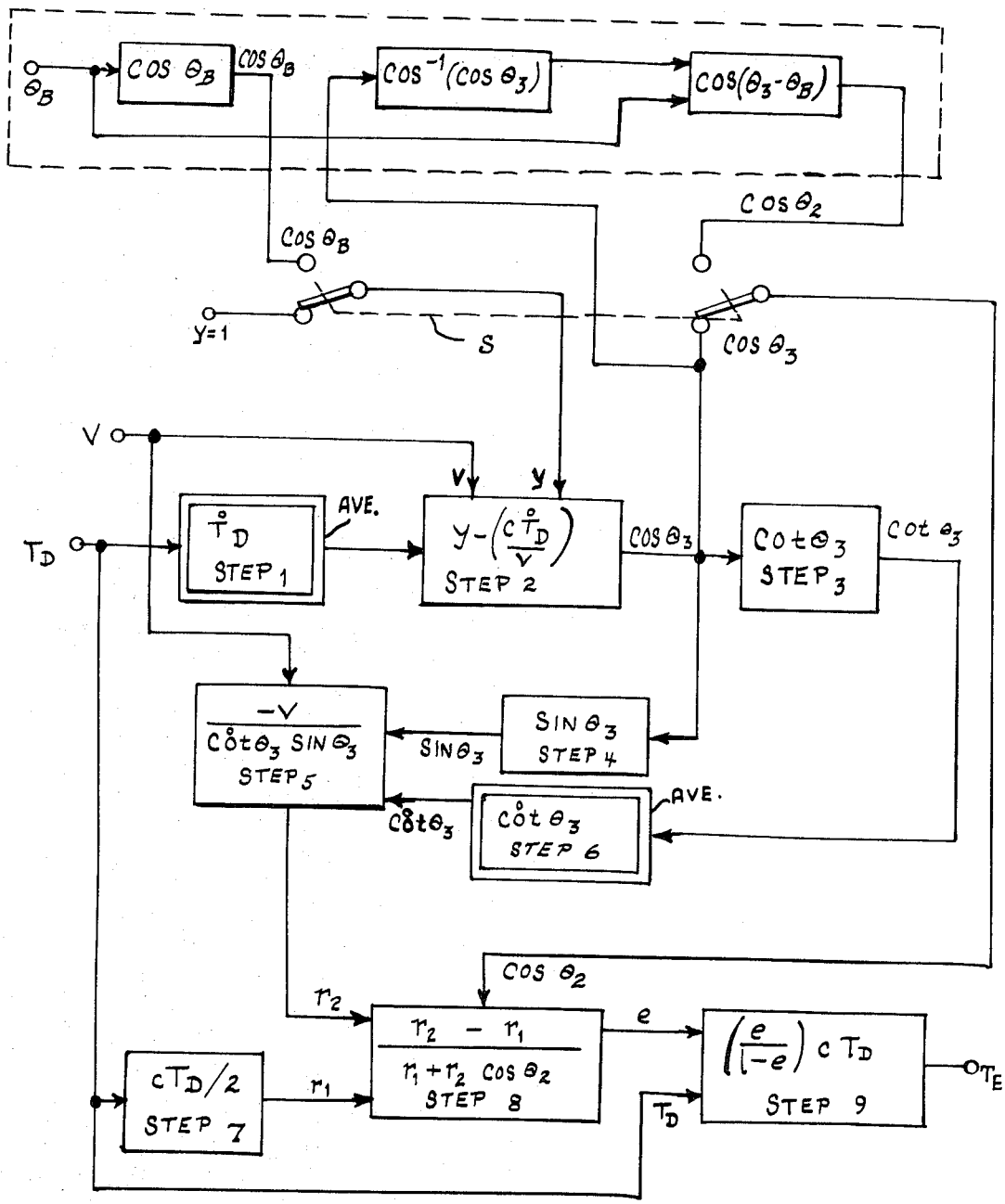
FIG. 5 is a detailed flow diagram showing the computational procedures and programming.

FIG. 4 shows the basic steps taken to achieve range readout, and FIG. 5 shows the computational flow diagram to determine the range. In FIG. 4, it is shown that the position of the reflector with respect to the observer is obtained by using the speed of the observer the emitter bearing in relation to the observer's direction, and the rate of change of the difference of arrival of pulses emanating from the emitter. This rate of change is determined by the time difference of arrival which is also used to compute the distance from the observer to the vortex of the ellipse behind the observer. The observer to vortex distance together with the relfector position is used to determine the eccentricity of the ellipse. With this eccentricity and the time difference of arrival the range is determined. In FIG. 5 the blocks enclosed in the dotted lines can be omitted if the system is used for the boresight case only. Ganged switch S is shown in the boresight case only and is switched to the alternate position for the general case.

The boxes with the double line indicate an averaging process to smooth the data. In FIG. 5 the following symbols are used (where the subscripts are shown in the figure in two digits, the second digit indicates the sequential position or reading).

$v$ = speed of the observer $\theta_B$ = the angle between the flight course and the homing line (i.e., the direction toward the emitter)

$\theta_2$ = the angle between the homing line and the reflector direction $\theta_3$ = the angle between the flight course and the reflector direction (by definition $\theta_3 = \theta_B = \theta_2$, and for homing case $\theta_3 = O_2$ since $\theta_B = O$ as shown in FIGS. 1 and 2)

$r_1$ = the distance between the observer and the vortex of the ellipse behind the observer $r_2$ = the distance between the observer and the reflector $c = 3 \times 10^8$ meters/second (a constant for the speed of light).

The relationships determined from FIG. 5 are obtained from the following formulas:

$r_E = (e/1-e) \, c \, T_D$
$e = (r_2 - r_1)/(r_1 + r_2 \cos\theta_2)$
$r_1 = cT_D/2$
$r_2 = -v/\cot\theta_3 \sin\theta O_3$
$\theta_2 = \theta_3 - \theta_B = \cos^{-1} \cos\theta_B - (cT_D/v) - \theta_B$.

As a special case for the boresight case, $\theta_2 = \theta_3$ since $\theta_B = 0$. Hence, the above equation reduces to $\theta_2 = \theta_3 = \cos^{-1} 1 - (cT_D/v)$.

Since $\theta_B = 1$ in the boresight case, it is entered as the constant $y = 1$.

It is immediately obvious that the time measurement must be extremely accurate, requiring a measurement device such as the El Dorado Model 793 1 nanosec, Time Interval Counter. As a consequence, the time measurement will probably be in a digital format. This will facilitate the $T_D/2$ calculation and offers no problem in determining $T_D$.

The measurement of $v$ (speed) would normally, for airborne missions, be provided by the on-board navigation system. The data format could be either digital or analog with the latter predominating in the older or less sophisticated systems. The former implies an on-board digital navigation computer which may be not necessarily be avilable.

The bearing angle measurement might be obtained by a conventional monopulse direction finding system. Neither the antennas nor the receiver, for detection of either the emitter or reflectors, appear to offer any major problems. Either crystal video or superheterodyne receivers are applicable.

What is claimed is:

1. A system for determining range by a moving observer of an electromagnetic emitter of successive signals derived from a geometric configuration that defines an ellipse where the emitter is at one focus and the observer is at the other focus, comprising:

a. a reflector;
    b. means for measuring the time differences of arrival between successive direct emitter signals and reflected signals from the reflector;
    c. means for determining the rate of change of time differences of arrival, said means being fed by the time difference measuring means;
    d. means for detecting the distance from the observer to the vortex of the ellipse behind the observer defining one focus of the ellipse, the distance detecting means being fed by the time difference measuring means;
    e. a source of observer speed;
    f. means for detecting the bearing of the emitter relative to the observer;
    g. means for detecting the position of the reflector with respect to the observer with the reflector lying on the ellipse, the position detecting means being fed by the source of observer speed, the bearing detecting means, and the time rate of change of differences of arrival measuring means;
    h. means for computing the eccentricity of the ellipse, the eccentricity computing means being fed by the reflector position detecting means and the observer to vortex distance detecting means; and
    i. means for computing the range between the observer and the emitter, the range computing means being fed by the eccentricity computing means and the time difference of arrival measurement means.

2. A method of determining range by a moving observer of an electromagnetic emitter of successive signals from a geometric configuration that defines a plurality of ellipses where the emitter is at one focus and the observer is at the other focus, comprising:
   a. measuring the time difference of arrival times of direct emitter signals and emitter signals reflected from a reflector;
   b. measuring the rate of change of the time differences of arrival of the successive emitter signals and reflections;
   c. detecting the distance from the observer to the vortex of the ellipse behind the observer;
   d. measuring the velocity of the observer;
   e. detecting the bearing of the emitter relative to the observer;
   f. detecting the position of the reflector with respect to the observer with the reflector lying on the ellipse, the reflector position detecting being defined by the observer speed, the emitter bearing and the rate of change of the time differences of arrival of successive direct emitter signals and reflected emitter signals;
   g. computing the eccentricity of the ellipses as defined by the position of the reflector and vortex to observer position; and
   h. computing the range between the observer and the emitter as defined by the eccentricity of the ellipse and the difference of arrival times of the direct and reflected emitter signals.

* * * * *